(12) United States Patent
Takeuchi

(10) Patent No.: US 11,870,960 B2
(45) Date of Patent: Jan. 9, 2024

(54) IMAGE PROCESSING SYSTEM

(71) Applicant: KYOCERA Document Solutions Inc., Osaka (JP)

(72) Inventor: Toshimitsu Takeuchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/971,750

(22) Filed: Oct. 24, 2022

(65) Prior Publication Data

US 2023/0140292 A1 May 4, 2023

(30) Foreign Application Priority Data

Oct. 28, 2021 (JP) .................................. 2021-176642

(51) Int. Cl.
*H04N 1/028* (2006.01)
*H04N 1/00* (2006.01)

(52) U.S. Cl.
CPC ....... *H04N 1/02815* (2013.01); *H04N 1/0075* (2013.01)

(58) Field of Classification Search
CPC ....... G03G 15/04045; G03G 15/04054; G03G 15/043; G03G 15/04018; G03G 15/50; G03G 2215/0402; G03G 2215/0446; G03G 2215/047; H04N 1/3877; H04N 1/3935; H04N 1/00127; H04N 1/00236; H04N 1/0071; H04N 1/00713; H04N 1/32; H04N 2201/0013; H04N 2201/0015; H04N 2201/0051; H04N 2201/0056; H04N 2201/0091; H04N 1/0075; H04N 1/02815; B41J 2/17566; B41J 2/2142; G06T 3/4023; Y02D 10/00

USPC ......................................................... 358/475
See application file for complete search history.

(56) References Cited

U.S. PATENT DOCUMENTS

| | | | | |
|---|---|---|---|---|
| 11,622,057 B2* | 4/2023 | Tanga An | .......... | H04N 1/00702 358/474 |
| 2001/0035987 A1 | 11/2001 | Ishido et al. | ................... | 358/475 |
| 2004/0233478 A1 | 11/2004 | Ishido et al. | ................... | 358/449 |
| 2006/0062476 A1* | 3/2006 | Yamada | .............. | H04N 1/00819 382/224 |
| 2006/0280358 A1* | 12/2006 | Ishikawa | .......... | G01N 21/95607 382/149 |
| 2008/0024841 A1* | 1/2008 | Hattori | ............... | H04N 1/00779 358/498 |
| 2009/0122357 A1* | 5/2009 | Ishido | ................ | H04N 1/00748 358/449 |
| 2011/0122101 A1* | 5/2011 | Kurozuka | ............ | G03B 21/006 345/204 |

(Continued)

FOREIGN PATENT DOCUMENTS

JP 2001-346009 A 12/2001

*Primary Examiner* — Negussie Worku
(74) *Attorney, Agent, or Firm* — Stein IP, LLC

(57) ABSTRACT

Before reading of a document, an image processing control portion makes an image reading portion perform pre-scanning operation, which is scanning operation performed with a document cover open without a document placed on a placement surface, and checks the incident condition of external disturbance light on the image sensor. If it is judged that the incident condition is a predetermined state, the image processing control portion makes a control device perform a countermeasure process to make the room dimmer than it currently is.

6 Claims, 8 Drawing Sheets

(56) References Cited

U.S. PATENT DOCUMENTS

| | | | | |
|---|---|---|---|---|
| 2011/0205936 A1* | 8/2011 | Vanier | .................. | H04M 15/75 |
| | | | | 379/142.04 |
| 2013/0044357 A1* | 2/2013 | Igawa | ............... | H04N 1/00734 |
| | | | | 358/474 |
| 2016/0134794 A1* | 5/2016 | Grabau | ................ | G06F 1/3206 |
| | | | | 348/155 |
| 2016/0205280 A1* | 7/2016 | Kato | ....................... | H04N 1/10 |
| | | | | 358/1.12 |
| 2017/0302821 A1* | 10/2017 | Sasa | .................... | H04N 1/4076 |
| 2019/0295953 A1* | 9/2019 | Xie | .................... | H01L 25/0657 |
| 2020/0006988 A1* | 1/2020 | Leabman | ................. | A61B 8/56 |
| 2020/0412895 A1* | 12/2020 | Nakamura | ......... | H04N 1/02815 |
| 2021/0120140 A1* | 4/2021 | Masui | ................. | H04N 1/0288 |
| 2023/0237192 A1* | 7/2023 | Kahan | ................. | G06V 10/764 |
| | | | | 726/1 |

\* cited by examiner (STATE DURING READING)

IMAGE PROCESSING SYSTEM

INCORPORATION BY REFERENCE

This application is based on and claims the benefit of priority from Japanese Patent Application No. 2021-176642 filed on Oct. 28, 2021, the contents of which are hereby incorporated by reference.

BACKGROUND

The present disclosure relates to an image processing system incorporating an image processing apparatus that reads a document.

Image processing apparatuses which read a document are known. A known image processing apparatus, on accepting a request to perform a read job, shines light onto a document placed on a contact glass, receives the light reflected from the document, and reads the image of the document.

SUMMARY

According to one aspect of the present disclosure, an image processing system includes an image processing device and a control device. The control device is connected to the image processing apparatus so as to be able to communicate with the image processing apparatus and the control device controls the lightness in a room where the image processing apparatus is installed. The image processing apparatus includes a contact glass, a document cover, an image reading portion, and an image processing control portion. The contact glass has a placement surface on which to place a document and the document cover opens and closes with respect to the placement surface. The image reading portion includes a light source and an image sensor both arranged opposite from the placement surface side. The image reading portion shines light from the light source toward the contact glass and performs scanning operation to perform photoelectric conversion with the image sensor. The image processing control portion controls the image reading portion. Before the image reading portion reads the document, the image processing control portion makes the image reading portion perform pre-scanning operation, which is the scanning operation performed with the document cover open without the document placed on the placement surface, and checks the incident condition of external disturbance light on the image sensor based on read data of an image read in the pre-scanning operation. If it is judged that the incident condition is a predetermined state, the image processing control portion makes the control device perform a countermeasure process to make the room dimmer than it currently is.

DETAILED DESCRIPTION

Figure 1:
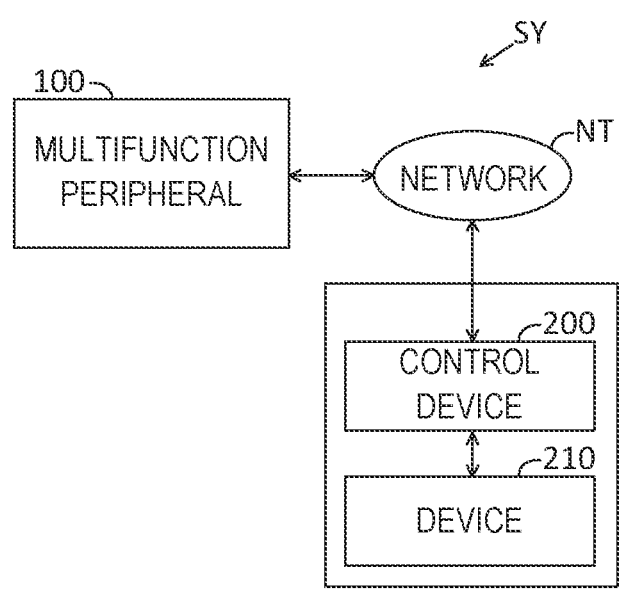
FIG. 1 is a schematic diagram showing an image processing system according to one embodiment.

<Image processing system> As shown in FIG. 1, an image processing system SY according to one embodiment includes a multifunction peripheral 100 and a control device 200. The multifunction peripheral 100 corresponds to an "image processing apparatus". The multifunction peripheral 100 and the control device 200 are connected to, so as to be able to communicate with, each other across a network NT.

The multifunction peripheral 100 is installed indoors such as in an office. The control device 200 controls the lightness in the room where the multifunction peripheral 100 is installed. Specifically, the control device 200 controls a device 210 for adjusting the lightness in the room. The control device 200 and the device 210 may together constitute an IOT (internet of things) device. In other words, the control device 200 may be one component of the LOT device.

The device 210 can be, for example, a shading member which covers a window and which opens and closes automatically (an electric curtain, or an electric blind, or the like), a dimmable glass installed in a window, or a lighting device which illuminates the room. The different kinds of device 210 just mentioned are only examples, and the lightness in the room may be adjusted by any other methods.

<Multifunction peripheral> Hereinafter, the multifunction peripheral 100 will be described. In the following description, the direction orthogonal to a flat floor on which the multifunction peripheral 100 is installed is defined as the up-down direction. The side at which the multifunction peripheral 100 is installed with respect to the floor is defined as the upper side, and the other side is defined as the lower side.

Figure 2:
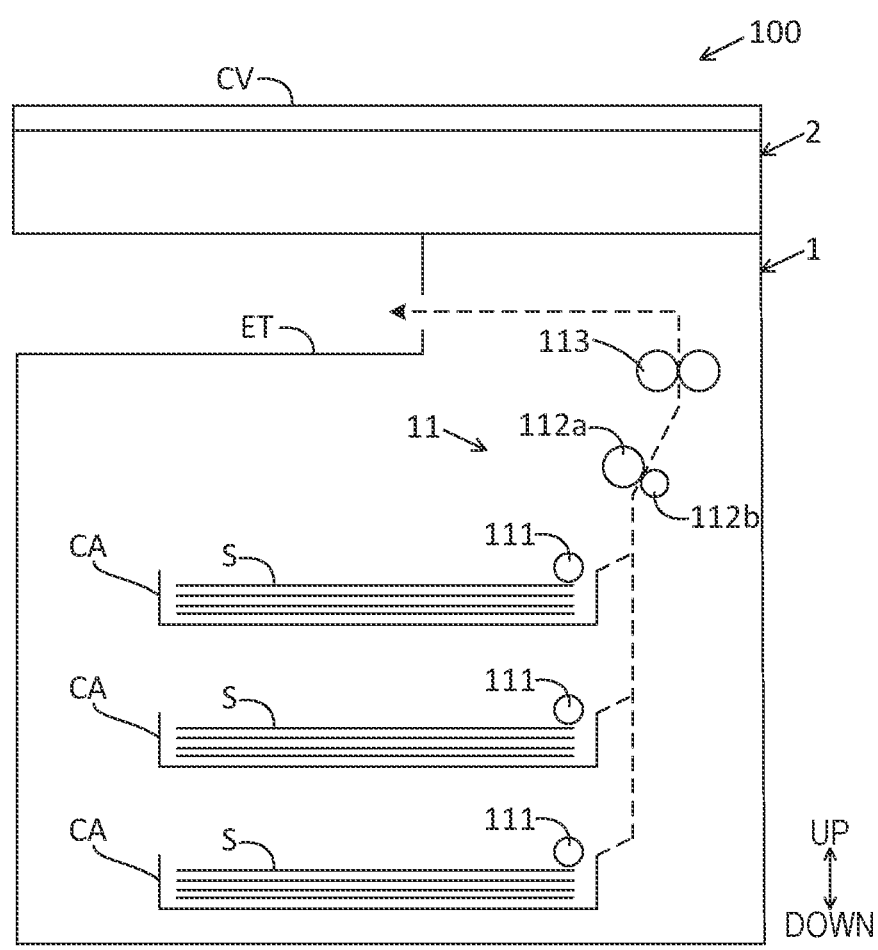
FIG. 2 is a schematic diagram showing a multifunction peripheral in the image processing system of the embodiment.

As shown in FIG. 2, the multifunction peripheral 100 includes an apparatus main body 1 which has a printing portion 11. The multifunction peripheral 100 also includes an image reading device 2. The image reading device 2 is mounted on top of the apparatus main body 1.

The printing portion 11 conveys a sheet S along a sheet conveyance passage (indicated by a broken line in FIG. 2). The printing portion 11 forms an image. The printing portion 11 prints the image on the sheet S being conveyed.

The printing portion 11 includes a sheet feed roller 111. The sheet feed roller 111 is in contact with the sheet S stored in a sheet cassette CA and, by rotating in that state, feeds the sheet S from the sheet cassette CA to the sheet conveyance passage.

The printing portion 11 includes a photosensitive drum 112*a* and a transfer roller 112*b*. The photosensitive drum 112*a* carries a toner image on its circumferential surface. The transfer roller H 2*b* is kept in pressed contact with the photosensitive drum 112*a*, and forms a transfer nip between itself and the photosensitive drum 112*a*. The transfer roller 112*b* rotates together with the photosensitive drum 112*a*.

The photosensitive drum 112a and the transfer roller 112b convey the sheet S having entered the transfer nip and meanwhile transfer the toner image to the sheet S.

Though not illustrated, the printing portion 11 further includes a charging device, an exposure device, and a developing device. The charging device electrostatically charges the circumferential surface of the photosensitive drum 112a. The exposure device forms an electrostatic latent image on the circumferential surface of the photosensitive drum 112a. The developing device develops the electrostatic latent image on the circumferential surface of the photosensitive drum 112a into a toner image.

The printing portion 11 includes a pair of fixing rollers 113. The pair of fixing rollers 113 has a heating roller and a pressing roller. The heating roller includes a heater (not illustrated), The pressing roller is in pressed contact with the heating roller and forms a fixing nip between itself and the heating roller. The pair of fixing rollers 113 rotates and thereby, while conveying the sheet S having entered the fixing nip, fixes the toner image transferred on the sheet S to the sheet S. The sheet S having left the fixing nip is discharged to a discharge tray ET.

The printing method in the printing portion 11 is not particularly limited. The printing method in the printing portion 11 can be an electrophotographic method or an inkjet method.

Figure 3:
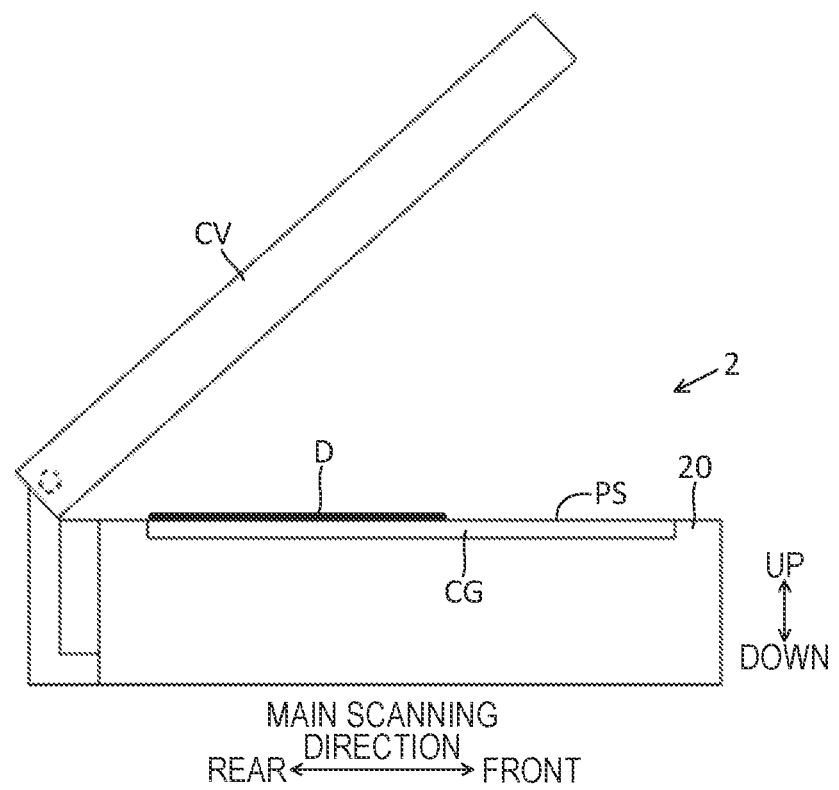
FIG. 3 is a diagram showing a document cover provided in the multifunction peripheral in the image processing system of the embodiment.

As shown in FIG. 3, the image reading device 2 includes a contact glass CG. The image reading device 2 also includes a document cover CV.

The contact glass CG is attached to a housing 20 of the image reading device 2. For example, the housing 20 is in the shape of a box with an opening on its top face. The contact glass CG is fitted in the top aperture of the housing 20.

The contact glass CG is a transparent glass plate. The contact glass CG has a placement surface PS on which the document D is placed. The placement surface PS faces upwards. The document D is placed on the placement surface PS such that the reading target surface faces downwards. That is, the reading target surface of the document D faces and makes contact with the placement surface PS.

The document cover CV is rotatably attached to the housing 20, The document cover CV, when viewed from in front of the multifunction peripheral 100, rotates about a rear portion of it as a fulcrum such that a front portion of it swings up and down. The document cover CV opens and closes with respect to the placement surface PS of the contact glass CG. With the document cover CV closed, the placement surface PS is covered with the document cover CV from above (the placement surface PS is blocked). With the document cover CV open, the placement surface PS is open (the placement surface PS is exposed). In an area of the document cover CV disposed opposite the placement surface PS with the document cover CV closed, a white mat, not illustrated, is provided. FIG. 3 shows a state in which the document cover CV is open.

Figure 4:
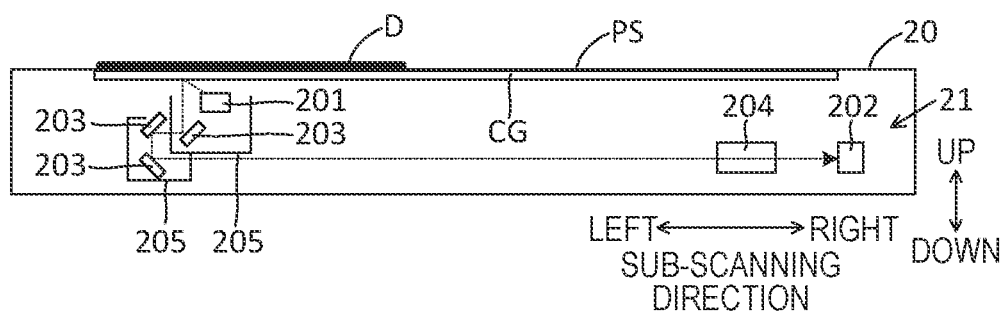
FIG. 4 is a diagram showing an image reading portion provided in the multifunction peripheral in the image processing system of the embodiment.

As shown in FIG. 4, the image reading device 2 includes an image reading portion 21. The reading method in the image reading portion 21 is a CCD method. Note that the reading method in the image reading portion 21 may be a CIS method.

The image reading portion 21 is provided at the reverse side of the contact glass CG, opposite from the placement surface PS side. The image reading portion 21 includes a light source 201 and an image sensor 202. The image reading portion 21 shines light from the light source 201 toward the contact glass CG and performs scanning operation in which photoelectric conversion is performed by the image sensor 202. The image reading portion 21 includes a mirror 203 and a lens 204. The light source 201, the image sensor 202, the mirror 203, and the lens 204 are provided inside the housing 20.

The light source 201 has a plurality of LED elements (not illustrated), The plurality of LED elements are arrayed in a line in the main scanning direction (the direction perpendicular to the plane of FIG. 4). The image sensor 202 has a plurality of photoelectric conversion elements arranged in the main scanning direction. The mirror 203 reflects light toward the lens 204. The lens 204 gathers the light reflected by the mirror 203 and leads it to the image sensor 202.

The light source 201 and the mirror 203 are provided on a carriage 205 which is movable in the sub-scanning direction orthogonal to the main scanning direction. As the carriage 205 moves, the reading line along which the image reading portion 21 performs reading moves in the sub-scanning direction.

In a job involving reading of a document D (hereinafter, simply called a read job), the document D is placed on the placement surface PS and the document cover CV is closed. As will be described in detail later, the read job may be performed with the document cover CV open.

When the read job starts, the carriage 205 moves in the sub-scanning direction (the direction from left to right as viewed from in front of the device). While the carriage 205 is moving in the sub-scanning direction, the light source 201 shines light toward the contact glass CG. The image sensor 202 reads the document D line by lime. That is, the image sensor 202 receives the light reflected by the document D. The image sensor 202 accumulates electric charge through photoelectric conversion on one pixel after another on a line-by-line basis and outputs an analog signal corresponding to the accumulated electric charge.

Note that a document conveyance unit for conveying the document D may be provided in the image reading device 2. In that case, the document conveyance unit functions as the document cover CV.

Figure 5:
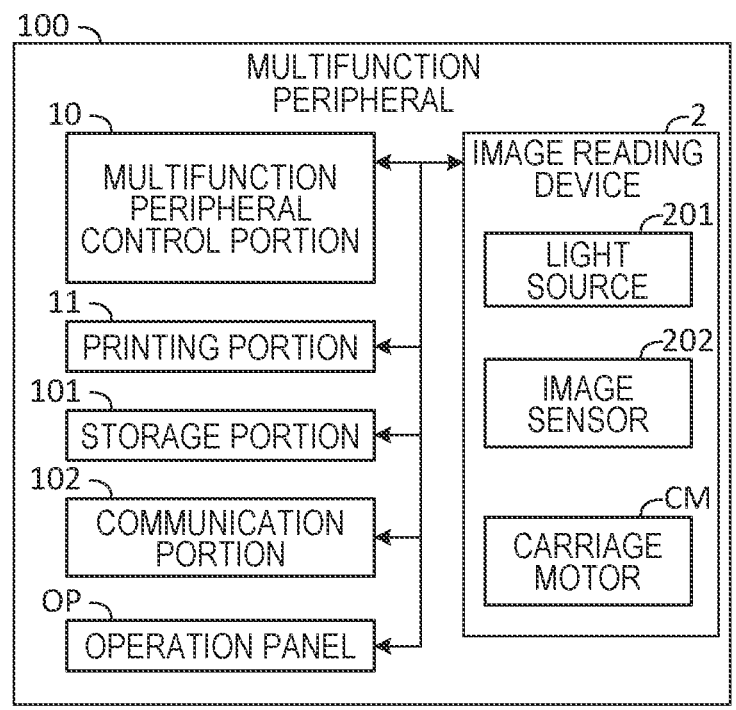
FIG. 5 is a block diagram of the multifunction peripheral in the image processing system of the embodiment.

As shown in FIG. 5, the multifunction peripheral 100 includes a multifunction peripheral control portion 10. The multifunction peripheral control portion 10 corresponds to an "image processing control portion." The multifunction peripheral 10 includes control circuits such as a CPU, an ASIC, and the like. The multifunction peripheral control portion 10 controls a variety of jobs, such as a read job, performed on the multifunction peripheral 100.

The multifunction peripheral control portion 10 is connected to a storage portion 101. The storage portion 101 includes storage devices such as a ROM, a RAM, an HDD, and the like.

The multifunction peripheral control portion 10 is connected to a communication portion 102. The communication portion 102 includes a communication circuit and the like. The communication portion 102 is connected to a network NT. The multifunction peripheral control portion 10 communicates with the control device 200 by using the communication portion 102.

The multifunction peripheral 100 includes an operation panel OP. The operation panel OP is provided with a touch screen. The touch screen displays a screen and accepts a touch operation. The operation panel OP is provided also with hardware buttons such as a start button for accepting a request to perform a job. The operation panel OP is connected to the multifunction peripheral control portion 10. The multifunction peripheral control portion 10 controls display operation on the operation panel OP. The multifunction peripheral control portion 10 detects an operation on the operation panel OP.

The multifunction peripheral control portion 10 controls the image reading device 2. The multifunction peripheral control portion 10 is connected to each of the light source 201 and the image sensor 202. The multifunction peripheral control portion 10 controls the light source 201 and the image sensor 202 individually. To the multifunction peripheral control portion 10, a carriage motor CM for moving the carriage 205 in the sub-scanning direction is connected. The multifunction peripheral control portion 10 controls the carriage motor CM. That is, the multifunction peripheral control portion 10 controls the movement of the carriage 205 in the sub-scanning direction.

The multifunction peripheral control portion 10 includes an analog processing portion (not illustrated). The analog processing portion is configured with an amplification circuit, an A/D conversion circuit, and the like. The analog processing portion converts the analog signal from the image sensor 202 into digital data. For example, the analog processing portion converts the pixel values (pixel density values) of a plurality of pixels into digital data represented in 256 gradations from 0 to 255. A pixel with a pixel value of "0" is the dimmest (darkest) and pixels with a pixel value of "255" is the brightest (lightest). The multifunction peripheral control portion 10 makes various kinds of correction such as shading correction.

<Read job involving a cropping process> The multifunction peripheral 100 has an auto-crop function. The operation panel OP accepts from the user an instruction operation as to whether to enable or disable the auto-crop function. On accepting an instruction to enable the auto-crop function, the multifunction peripheral control portion 10 makes the image reading device 2 perform a read job involving a cropping process.

If the job to be performed is a read job involving a cropping process, the multifunction peripheral control portion 10 makes the image reading portion 21 read the entire area of the placement surface PS (that is, perform scanning operation over the entire area of the placement surface PS). For example, in the read job involving the cropping process, the reading range by the image reading portion 21 is set to a predefined maximum range (the reading range for reading a document D of a predefined maximum size). Thus, the entire area of the placement surface PS is taken as the reading range.

When the reading by the image reading portion 21 is finished, the multifunction peripheral control portion 10 obtains read data of the image read in the scanning operation (an image over the entire area of the placement surface PS) and performs the cropping process on the read data. As the cropping process, the multifunction peripheral control portion 10 performs a process of automatically cropping the image data of the document D out of the read data.

When performing the cropping process, the multifunction peripheral control portion detects the image data of the document D in the read data. For example, the multifunction peripheral control portion 10 detects the outline of the document D (the edge pixels forming the outline) by performing an edge detecting process on the read data and detects the area enclosed by the thus detected outline as a cropping target. Then the multifunction peripheral control portion 10 crops out as the image data of the documents D the area detected as the cropping target in the read data.

After the cropping process, the multifunction peripheral control portion 10 generates output data corresponding to the image data of the document D and performs an output process for output data Here, jobs involving the reading of a document D include a copy job, a transmission job, and the like. If the job to be performed is a copy job, the multifunction peripheral control portion 10 performs as the output process a process of printing an image based on the image data of the document D on a sheet S. If the job to be performed is a transmission job, the multifunction peripheral control portion 10 performs as the output process a process of transmitting the image data of the document D (for example, PDF data) to an external device.

When generating the output data, the multifunction peripheral control portion 10 performs various kinds of image processing (correction process) to the image data of the document D. For example, the multifunction peripheral control portion 10 corrects a tilt of the image data of the document D by performing a rotation process on the image data of the document D. The multifunction peripheral control portion 10 also enlarges and reduces the image data of the document D to fit it to the size of an output page. Note that a process of adjusting the contrast, lightness, distortion, or the like of the image may be performed on the image data of the document D.

The auto-crop function is used to read a card type document D such as a license card, an insurance card, and a business card (hereinafter occasionally referred to as a card document D). Incorporating the auto-crop function in the multifunction peripheral 100 helps enhance user convenience.

Figure 6:
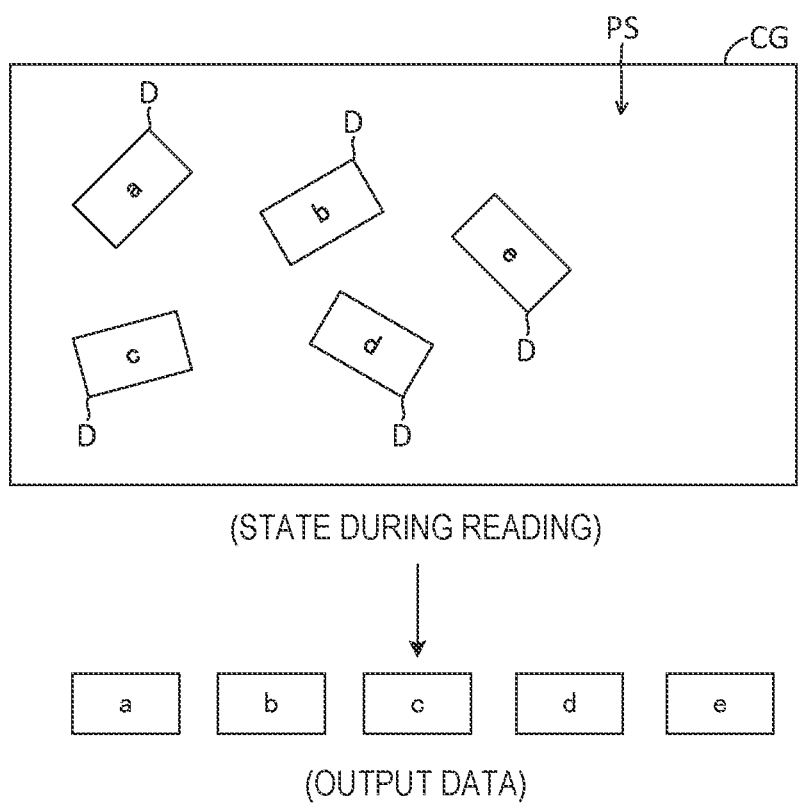
FIG. 6 is a diagram illustrating a read job (cropping process) performed on the multifunction peripheral in the image processing system of the embodiment.

For example, suppose that, as shown in the upper part of FIG. 6, a read job is performed with a plurality of card documents D placed randomly on the placement surface PS. In this case, scanning operation over the entire area of the placement surface PS is performed once and read data is generated. Then, a plurality of sets of image data corresponding to the plurality of card documents D respectively are cropped out. In this way, as shown in the lower part of FIG. 6, a plurality of sets of output data corresponding to the plurality of card documents D respectively are generated. This is convenient to the user because of the ability to acquire output data for a plurality of cards in one job.

<Effect of external disturbance light> With the auto-crop function, a plurality of documents D can be read in one read job. Even so, when there are a very large number of documents D, reading of the plurality of documents D must be performed at multiple times. The user needs to repeat a series of tasks such as placing several to several tens of documents D on the placement surface PS, pressing the start button on the operation panel OP, and removing the documents D from the placement surface PS after reading (needs to perform the read job multiple times). That is, the user needs to open and close the document cover CV multiple times.

Opening and closing the document cover CV multiple times is troublesome to the user. For this reason, the document cover CV may be kept open. That is, the read job may be performed with the document cover CV open.

Also when a book-form document D (for example, a hardcover book) is read, the document cover CV may be kept open. Even if the reading target is a normal document D (for example, a sheet of plain paper), some users keep the document cover CV open.

Here, in the read job, the multifunction peripheral control portion 10 performs the edge detecting process. The edge detecting process is a process of detecting a shadow that appears when the edge of the document D on the placement surface PS is irradiated with light as the edge of the document D (the outline of the document D). The multifunction peripheral control portion 10 determines the placement position of the document D on the placement surface PS based on the edge of the document D detected in the edge detecting process. The multifunction peripheral control portion 10 determines the size of the document D on the placement surface PS based on the edge of the document D detected in the edge detecting process.

In a read job with the document cover CV open, external disturbance light such as sunlight and illumination light may be incident on the image sensor 202 through the contact glass CG from the placement surface PS side. If external disturbance light is incident on the image sensor 202, the accuracy of the edge detecting process may be degraded. In some cases, the edge of the document D may not be detected. For example, in a read job involving the cropping process, if the accuracy of the edge detecting process is degraded, the image data of the document D in the read data may not be detected. That is, the image data of the document D the read data may not be cropped out. Also, the size of the document D may not be detected.

Figure 7:
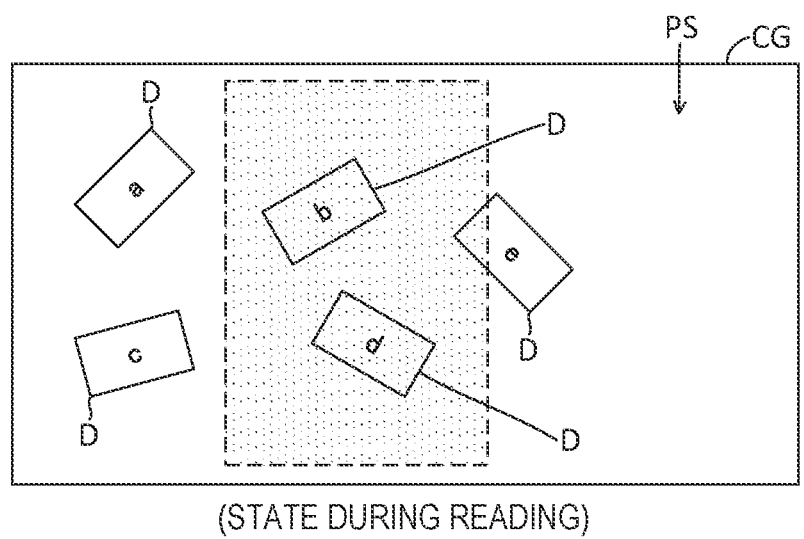
FIG. 7 is a diagram showing a state in which external disturbance light is incident during the read job performed on the multifunction peripheral in the image processing system of the embodiment.

In the example shown in FIG. 6, suppose that external disturbance light is incident through the contact glass CG. For example, suppose that external disturbance light is incident on the area enclosed by a broken line shown in FIG. 7. In this case, the detection accuracy of the edges of the card documents D marked b, d, and e, is degraded.

<Shielding of external disturbance light> The effect of external disturbance light can be reduced by shielding it. For example, the user themselves can take an action such as closing a curtain. Even so, it is difficult for the user to judge whether inconvenience will occur due to the effect of external disturbance light. Also, it is troublesome for the user themselves to take an action for shielding external disturbance light.

Thus, when external disturbance light causes inconvenience, the image processing system SY automatically performs a countermeasure process. Through the countermeasure process, the room becomes dimmer than before. That is, the countermeasure process is a process to make the room dimmer and shield external disturbance light. This is convenient to the user because they themselves no longer need to take an action for shielding external disturbance light.

When a read job is performed with the document cover CV closed, there is no need to shield external disturbance light. Accordingly, for example, before the read job is performed, the operation panel OP accepts from the user an instruction whether to perform the read job with the document cover CV open or not. If the instruction to perform the read job with the document cover CV open is accepted, the multifunction peripheral control portion 10 checks the incident condition of external disturbance light on the image sensor 202. Then, if it is judged that the incident condition of external disturbance light is a predetermined state, the multifunction peripheral control portion 10 makes the control device 200 perform as the countermeasure process a process to make the room dimmer than it currently is.

Hereinafter, referring to the flow chart in FIG. 8, a description will be given of the flow of operation performed on accepting an instruction to perform a read job with the document cover CV open.

For example, on accepting an instruction to perform a read job with the document cover CV open, the operation panel OP displays an indication message for the user. The instruction message is a message prompting the user to do a predetermined operation with the document cover CV open without a document D placed on the placement surface PS before executing the read job. The predetermined operation is, for example, an operation on a predetermined button such as the start button.

The operation panel OP accepts the predetermined operation done with the instruction message displayed as an instruction to perform the pre-scanning operation. When the operation panel OP accepts the instruction to perform pre-scanning operation, the flow shown in FIG. 8 starts.

Figure 8:
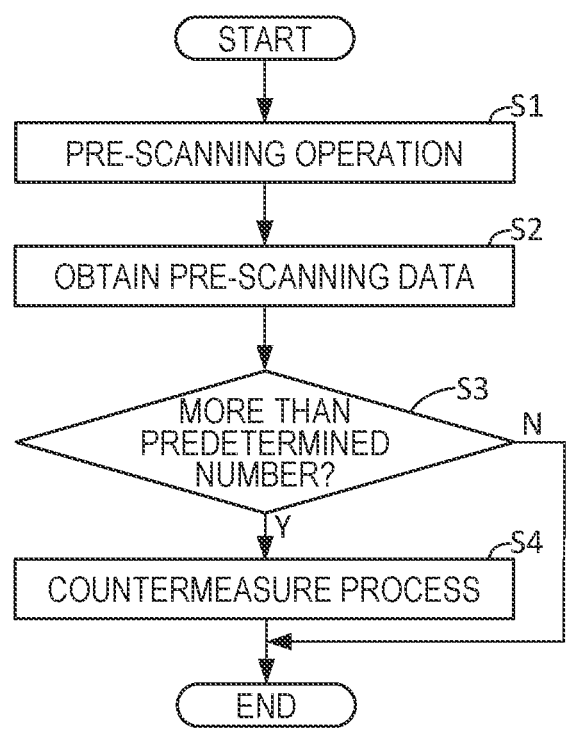
FIG. 8 is a flow chart showing a flow of operation performed on the multifunction peripheral in the image processing system of the embodiment.

At the start of the flow shown in FIG. 8, the instruction message is shown on the operation panel OP. Thus, at the start of the flow shown in FIG. 8, the image reading device 2 has the document cover CV open and has no document D placed on the placement surface PS.

In step S1, the multifunction peripheral control portion 10 makes the image reading portion 21 to perform the pre-scanning operation, which is scanning operation performed with the document cover CV open without a document D placed on the placement surface PS. In the pre-scanning operation, the entire area of the placement surface PS is the reading target. That is, the image reading portion 21 reads an image over the entire area of the placement surface PS with the document cover CV open without a document D placed on the placement surface PS.

In step S2, the multifunction peripheral control portion 10 acquires read data of the image read in the pre-scanning operation by the image reading portion 21. The read data acquired by the multifunction peripheral control portion 10 is digital data that represents the pixel values of a plurality of pixels in 256 gradations from 0 to 255. In the following description, for distinction from other read data, the read data of an image read in the pre-scanning operation is referred to as pre-scanning data.

In step S3, the multifunction peripheral control portion 10 detects the pixel values representing the lightness of the pixels in the pre-scanning data. The multifunction peripheral control portion 10 checks the incident condition of external disturbance light on the image sensor 202 based on the pixel values representing the lightness of the pixels in the pre-scanning data. Based on the incident condition of external disturbance light on the image sensor 202, the multifunction peripheral control portion 10 checks whether the incident condition of external disturbance light on the image sensor 202 is the predetermined state in which to perform the countermeasure process.

For example, a pixel value observed when external disturbance light is incident on the image sensor 202 is determined experimentally. Then, based on the pixel value observed when external disturbance light is incident on the image sensor 202, a threshold value for external disturbance light detection is defined. The storage portion 101 stores the predefined threshold value for external disturbance light detection.

The multifunction peripheral control portion 10, for each pixel in the pre-scanning data, checks whether it is a pixel with a corresponding pixel value lighter than the threshold value or not. In the pre-scanning data, a pixel with a corresponding pixel value lighter than the threshold value is a pixel affected by external disturbance light. The multifunction peripheral control portion 10 recognizes the number of pixels with corresponding pixel values lighter than the threshold value.

The multifunction peripheral control portion 10 then checks whether the number of pixels in the pre-scanning data which are lighter than the threshold value is larger than a predetermined number (the predetermined number may be any number larger than one) or not. The larger the incident area of external disturbance light, the larger the number of pixels which are lighter than the threshold value. That is, the fact that there are more than the predetermined number of pixels in the pre-scanning data which are lighter than the threshold value means that inconvenience due to external disturbance light are likely to occur. For this reason, when there are more than the predetermined number of pixels in the pre-scanning data which are lighter than the threshold value, it is preferable to perform the countermeasure process.

In step S3, if the multifunction peripheral control portion 10 judges that there are more than the predetermined number of pixels in the pre-scanning data which are lighter than the threshold value, an advance is made to step S4. When an advance is made to step S4, the multifunction peripheral control portion 10 makes the control device 200 perform the countermeasure process. By contrast, if the multifunction peripheral control portion 10 judges that the number of pixels in the pre-scanning data which are lighter than the threshold value is equal to or smaller than the threshold value, the countermeasure process is not performed.

When an advance is made to step S4, the multifunction peripheral control portion to make the control device 200 perform the countermeasure process, communicates with the control device 200 by using the communication portion 102. The multifunction peripheral control portion 10 transmits an instruction to perform the countermeasure process to the control portion 200.

On receiving the instruction of the countermeasure process, the control device 200 performs the countermeasure process. The control device 200 performs, as the countermeasure process, at least one of the following processes: a process to control the opening and closing of a light-shielding member (such as a curtain or a blind) to cover the window, a process to control the light transmittance of a dimmable glass provided in a window, and a process to control the lightness of illumination light from a lighting device, That is, the control device 200 makes the room dimmer it currently is by operating the device 210.

In the configuration of this embodiment, when the incident condition of external disturbance light on the image sensor 202 is the predetermined state, that is, when there is a possibility of inconvenience occurring due to external disturbance light, the countermeasure process to make the room dimmer than it currently is automatically performed. By the countermeasure process, it is possible to suppress incidence of external disturbance light on the image sensor 202 even if a read job is performed with the document cover CV open. It is thus possible, in a read job performed with the document cover CV open, to suppress occurrence of inconvenience due to external disturbance light, such as inconvenience of not being able to accurately detect the edge of the document D.

Moreover, in the configuration of this embodiment, the incident condition of external disturbance light on the image sensor 202 is judged based on the read data of an image read in the pre-scanning operation (pre-scanning data). Specifically, when there are more than the predetermined number of pixels in pre-scanning data which are lighter than the threshold value, the incident condition of external disturbance light on the image sensor 202 is judged to be the predetermined state (a state in which inconvenience due to external disturbance light may occur), that is, a state that requires the countermeasure process. It is thus possible to prevent the countermeasure process being performed unnecessarily.

With the configuration of this embodiment, the user themselves do not need to judge whether the countermeasure process is necessary or not. Also, if the countermeasure process is necessary, the user themselves do not need to take any action. This is convenient to the user.

<Checking for fulfillment of a predetermined condition>

After performing the countermeasure process, the control device 200 judges whether a predetermined condition is met or not. The control device 200 keeps the state obtained by the countermeasure process until the predetermined condition is met. When the predetermined condition is met, the control device 200 performs a process to make a return from the state obtained by the countermeasure process to the original state (that is, the state before the countermeasure process).

For example, after completing the countermeasure process, the control device 200 transmits a completion notification to the effect that the countermeasure process has been completed to the multifunction peripheral 100. When the multifunction peripheral 100 receives the completion notification as to the countermeasure process, the multifunction peripheral control portion 10 displays on the operation panel OP a message that a read job is ready to be performed. When the message is displayed, the user places a document D on the placement surface PS and enters an instruction to perform the read job (does an operation on the start button on the operation panel OP). On receiving the instruction to perform the read job, the multifunction peripheral control portion 10 executes the read job. After completing the read job, the multifunction peripheral control portion 10 transmits a completion notification to the effect that the read job has been completed to the control device 200. On receiving the completion notification as to the read job, the control device 200 judges that the read job is completed. After the read job is completed, the control device 200 performs a process to make a return from the state obtained by the countermeasure process to the original state.

Hereinafter, predetermined conditions for different processes will be described assuming that there are three countermeasure processes: a first process to close a light-shielding member such as a curtain or a blind, a second process to lower the light transmittance of a dimmable glass, and a third process to dim the illumination light from a lighting device. For example, the first, second, and third processes are controlled by a single control device 200. Instead, separate control devices 200 may be assigned to the first, second, and third processes respectively, 1. The First Process For example, a year is divided into a plurality of periods, and a time zone is set for each period. In one example, the start time of a given time zone is set to 8:00 and its end time is set to 8:00 of the next day.

The control device 200 recognize the time zone corresponding to the current period as a target time zone. Also, after performing the countermeasure process, on receiving the completion notification as to the read job, the control device 200 recognizes the time when it has received the completion notification as to the read job (hereinafter referred to as the job completion time).

If the job completion time falls outside the target time zone, the control device 200 judges that the predetermined condition is met when it receives the completion notification as to the read job. Accordingly, if the job completion time falls outside the target time zone, then immediately after the read job is completed, a return is made from the state obtained by the countermeasure process to the original state. In the first process, the light-shielding member is opened.

If the job completion time falls within the target time zone, the control device 200 does not judge that the predetermined condition is met instantly even when it receives the completion notification as to the read job. Specifically, the control device 200 keeps the state obtained by the countermeasure process until the end time of the target time zone. When the end time of the target time zone comes, the control device 200 judges that the predetermined condition is met, and makes a return from the state obtained by the countermeasure process to the original state. In the first process, the light-shielding member is kept closed until the end time of the target time zone (for example, 8:00), and when the end time of the target time zone comes, the light-shielding member is opened.

2. The Second Process

As in the first process, a year is divided into a plurality of periods, and a time zone is set for each period. The control device 200 recognize the time zone corresponding to the current period as a target time zone.

If the job completion time falls outside the target time zone, the control device 200 judges that the predetermined condition is met when it receives the completion notification as to the read job. By contrast, if the job completion time falls within the target time zone, the control device 200 judges that the predetermined condition is met when the end time of the target time zone comes.

In the second process, the light transmittance of the dimmable glass may be changed according to the period.

3. The Third Process

In a case where the third process is performed as the countermeasure process, on receiving the completion notification as to the read job, the control device 200 judges that the predetermined condition is met. That is, after the illumination light from the lighting device becomes dim, when the read job is completed, the original lightness of the illumination light is immediately restored.

With the configuration of this embodiment, after the countermeasure process is performed, a return from the state obtained by the countermeasure process to the original state can be made at an appropriate timing.

<Countermeasures according to the incident condition of external disturbance light> A plurality of processes (first, second, and third processes) are available as countermeasure process, That is, the control device 200 can selectively execute one of a plurality of countermeasure processes. In this case, the multifunction peripheral control portion checks the incident condition of external disturbance light on the image sensor 202, based on the pre-scanning data (pixel values of pixels). Then, the multifunction peripheral control portion 10 changes the countermeasure process performed by the control device 200 based on the incident condition of external disturbance light.

For example, the pixel values can differ between when sunlight is incident and when illumination light is incident. When sunlight is incident, the pixel values are lighter than when illumination light is incident. Accordingly, a first threshold value and a second threshold value are used as threshold values for external disturbance light detection. The second threshold value is a threshold value representing a lighter value than the first threshold value.

After obtaining the pre-scanning data, the multifunction peripheral control portion judges whether or not there are more than the predetermined number of pixels lighter than the first threshold value. If it is judged that there are more than the predetermined number of pixels lighter than the first threshold value, the multifunction peripheral control portion 10 judges that the incident condition of external disturbance light is the predetermined state. When the incident condition of external disturbance light is the predetermined state, the multifunction peripheral control portion 10 recognizes the number of pixels lighter than the second threshold value among a plurality of pixels lighter than the first threshold value. As a result, if the ratio of the number of pixels lighter than the second threshold value to the number of pixels lighter than the first threshold value exceeds a predetermined value (fir example, a value of 50% or more), the multifunction peripheral control portion 10 judges that the effect of sunlight is strong (sunlight is incident). By contrast, if the ratio of the number of pixels lighter than the second threshold value to the number of pixels lighter than the first threshold value is equal to or less than the predetermined value, the multifunction peripheral control portion 10 judges that the effect of illumination light is strong. In other words, if the ratio of the number of pixels lighter than the second threshold value to the number of pixels lighter than the first threshold value is equal to or less than the predetermined value, the multifunction peripheral control portion 10 judges that not sunlight but illumination light is incident.

If it is judged that the sunlight is incident, the multifunctional peripheral control portion 10 makes the control device 200 perform the first or second processes. By contrast, if it is judged that the illumination light is incident, the multifunctional peripheral control portion makes the control device 200 perform the third process.

With this configuration, it is possible to perform an appropriate countermeasure process according to the incident condition of external disturbance light on the image sensor 202. As a result, it is possible to effectively prevent occurrence of inconvenience due to external disturbance light.

Here, both sunlight and illumination light may both exert an effect. That is, even the first and second processes are performed, inconvenience due to illumination light may occur. Likewise, even the third process is performed, inconvenience due to sunlight may occur.

Accordingly, the multifunction peripheral control portion 10 makes the control device 200 perform a plurality of countermeasure processes sequentially. Specifically, on receiving the completion notification as to a countermeasure process from the control device 200, the multifunction peripheral control portion 10 performs again a process to check the incident condition of external disturbance light on the image sensor 202 (hereinafter referred to as a checking process). To perform the checking process again, the multifunction peripheral control portion 10 makes the image reading portion 21 perform the pre-scanning operation again.

As a result of the checking process to check the incident condition of external disturbance light on the image sensor 202 being performed again, if it is judged that the incident condition of external disturbance light on the image sensor 202 is the predetermined state, the multifunction peripheral control portion 10 makes the control device 200 perform, instead of or in addition to the countermeasure process performed last time, another countermeasure process. For example, as a result of the checking process performed after the first process, if it is judged that the incident condition of external disturbance light on the image sensor 202 is the predetermined state, the multifunction peripheral control portion 10 makes the control device 200 perform the second process. After that, as a result of the checking process performed after the second process, if it is judged that the incident condition of external disturbance light on the image sensor 202 is the predetermined state, the multifunction peripheral control portion makes the control device 200 perform the third process.

With this configuration, it is possible to prevent occurrence of inconvenience due to external disturbance light even if both sunlight and illumination light are causing inconvenience.

It should be understood that the embodiment disclosed herein is in every aspect illustrative and not restrictive. The scope of the present disclosure is defined not by the description of the embodiment given above but by the appended claims, and encompasses any modifications made without departure from the scope and sense equivalent to those claims.

What is claimed is:

1. An image processing system comprising:
an image processing apparatus; and
a control device connected to the image processing apparatus so as to be able to communicate with the image processing apparatus via a network, the control device controlling lightness in a room where the image processing apparatus is installed;
wherein
the image processing apparatus includes:
a contact glass which has a placement surface on which to place a document;
a document cover which opens and closes with respect to the placement surface;
an image reading portion including a light source and an image sensor which are arranged opposite from the placement surface side, the image reading portion shining light from the light source toward the contact glass and performing scanning operation to perform photoelectric conversion with the image sensor; and
an image processing control portion which controls the image reading portion,
the control device controls a device for adjusting the lightness in the room,
before the image reading portion reads the document, the image processing control portion makes the image reading portion perform pre-scanning operation, which is the scanning operation performed with the document cover open without the document placed on the placement surface, and checks incident condition of external disturbance light on the image sensor based on read data of an image read in the pre-scanning operation; and
if it is judged that the incident condition is a predetermined state, the image processing control portion communicates with the control device, transmits an instruction to perform a countermeasure process to the control device, and
on receiving the instruction to perform the countermeasure process, the control device performs, as the countermeasure process, a process to make the room dimmer than it currently is by operating the device for adjusting the lightness in the room.

2. The image processing system according to claim 1, wherein
the image processing control portion detects a pixel value representing lightness of each pixel in the read data, and
if a number of pixels in the read data that are lighter than a predefined threshold value exceeds a predetermined value, the image processing control portion judges that the predetermined state is in effect.

3. The image processing system according to claim 1, wherein
after performing the countermeasure process, the control device keeps a state obtained by the countermeasure process until a predetermined condition is met.

4. The image processing system according to claim 1, wherein
if a plurality of countermeasure processes are available, the image processing control portion changes according to the incident condition the countermeasure process that image processing control portion makes the control device perform.

5. The image processing system according to claim 4, wherein
when the countermeasure process is completed, the control device transmits a completion notification as to the countermeasure process to the image processing apparatus,
on receiving the completion notification as to the countermeasure process, the image processing control portion makes the image reading portion perform the pre-scanning operation, and checks the incident condition again, and
if the incident condition checked again is the predetermined state, the image processing control portion makes the control device perform another countermeasure process instead of the countermeasure process performed last time or in addition to the countermeasure process performed last time.

6. The image processing system according to claim 1, wherein the countermeasure process includes at least one of: a process to control opening and closing of a light-shielding member for covering a window, a process to control light transmittance of a dimmable glass provided in a window, and a process to control a lighting device.

* * * * *